(12) United States Patent
Liang et al.

(10) Patent No.: US 11,916,215 B2
(45) Date of Patent: Feb. 27, 2024

(54) POWER SUPPLY BATTERY AND POWER SUPPLY SYSTEM FOR HIGH-SPEED MAGLEV TRAINS

(71) Applicant: CRRC QINGDAO SIFANG CO., LTD., Shandong (CN)

(72) Inventors: Jianying Liang, Shandong (CN); Donghua Wu, Shandong (CN); Xing Chen, Shandong (CN); Guimei Deng, Shandong (CN); Jiankang Xue, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 167 days.

(21) Appl. No.: 17/432,936

(22) PCT Filed: May 11, 2020

(86) PCT No.: PCT/CN2020/089520
§ 371 (c)(1),
(2) Date: Aug. 22, 2021

(87) PCT Pub. No.: WO2020/228653
PCT Pub. Date: Nov. 19, 2020

(65) Prior Publication Data
US 2022/0181723 A1    Jun. 9, 2022

(30) Foreign Application Priority Data

May 14, 2019  (CN) .......................... 201910398886.2
May 14, 2019  (CN) .......................... 201920684890.0

(51) Int. Cl.
*H01M 12/06*    (2006.01)
*H01M 4/46*     (2006.01)
(Continued)

(52) U.S. Cl.
CPC ........... *H01M 12/06* (2013.01); *H01M 4/463* (2013.01); *H01M 8/04283* (2013.01);
(Continued)

(58) Field of Classification Search
CPC .......... B60L 13/04; B60L 50/60; B60L 50/70; B60L 50/75; B60L 2200/26
See application file for complete search history.

(56) References Cited

U.S. PATENT DOCUMENTS

2011/0026172 A1*  2/2011  Matsumoto ............. B60L 58/40
                                                              361/31
2011/0115425 A1*  5/2011  Olsson .................... B60L 8/003
                                                              320/109
(Continued)

FOREIGN PATENT DOCUMENTS

CN           201109373 Y        9/2008
CN           103098339 A        5/2013
(Continued)

OTHER PUBLICATIONS

Wang, CN 104900942 Espacenet machine translation, 2017 (Year: 2017).*

(Continued)

*Primary Examiner* — Adam A Arciero
(74) *Attorney, Agent, or Firm* — Yue (Robert) Xu; Apex Attorneys at Law, LLP (57) ABSTRACT

A power supply battery and a power supply system for high-speed maglev trains are disclosed. The power supply battery comprises: an electrolyte tank, a plurality of liquid flow pumps, and a plurality of aluminum-air battery reactors. The plurality of aluminum-air battery reactors are sequentially connected in series. The electrolyte tank comprises a plurality of elongate electrolyte grooves. One liquid flow pump corresponds to one aluminum-air battery reactor and one electrolyte groove.

13 Claims, 4 Drawing Sheets

(51) Int. Cl.
  *H01M 8/04276* (2016.01)
  *B60L 50/60* (2019.01)
  *B60L 50/70* (2019.01)
  *B60L 50/75* (2019.01)
  *B60L 13/04* (2006.01)

(52) U.S. Cl.
  CPC .............. *B60L 13/04* (2013.01); *B60L 50/60* (2019.02); *B60L 50/70* (2019.02); *B60L 50/75* (2019.02); *B60L 2200/26* (2013.01)

(56) References Cited

U.S. PATENT DOCUMENTS

2013/0147424 A1  6/2013  Takano et al.
2014/0272609 A1  9/2014  Nagayama et al.

FOREIGN PATENT DOCUMENTS

| | | |
|---|---|---|
| CN | 103531832 A | 1/2014 |
| CN | 103875122 A | 6/2014 |
| CN | 104900942 A | 9/2015 |
| CN | 106602182 A | 4/2017 |
| CN | 108321344 A | 7/2018 |
| CN | 110224158 A | 9/2019 |
| CN | 210074046 U | 2/2020 |
| JP | 2000149975 A | 5/2000 |

OTHER PUBLICATIONS

The Japanese 1st Office Action dated Aug. 15, 2022 for JP2021-541529.
International Search Report for PCT/CN2020/089520 dated Aug. 14, 2020, ISA/CN.
The Chinese 1st Office Action dated Nov. 16, 2023 for CN201910398886.2.

\* cited by examiner

POWER SUPPLY BATTERY AND POWER SUPPLY SYSTEM FOR HIGH-SPEED MAGLEV TRAINS

CROSS REFERENCE OF RELATED APPLICATION

This application is a National Stage application of PCT international application PCT/CN2020/089520, filed on May 11, 2020, which claims the priority to the following patent applications, the content of which are incorporated herein by reference in their entirety:
(1) Patent Application No. 201910398886.2, titled "POWER SUPPLY BATTERY AND POWER SUPPLY SYSTEM FOR HIGH-SPEED MAGLEV TRAINS", filed on May 14, 2019 with the Chinese Patent Office.
(2) Patent Application No. 201920684890.0, titled "POWER SUPPLY BATTERY AND POWER SUPPLY SYSTEM FOR HIGH-SPEED MAGLEV TRAINS", filed on May 14, 2019 with the Chinese Patent Office.

FIELD

The present disclosure relates to the technical field of vehicle-mounted power supplies for maglev trains, and in particular to a power supply battery and a power supply system for a high-speed maglev train.

BACKGROUND

Currently, a maximum running speed of a high-speed maglev train in test reaches 503 km/h, and a maximum running speed in practical reaches 430 km/h in China. A high-speed maglev train with running speed greater than 600 km/h will emerge over time with technological innovation and research. Therefore, the high-speed maglev train will become one of main transportation means for long-distance running. However, the long-distance running of the high-speed maglev train may bring new technical problems, such as, how to ensure comfort of passengers in the train when the train stops due to a fault, and how to restart the train after the fault is repaired. Therefore, it is required to continue to supply power to the train when the train stops due to fault at any place on a long-distance running line.

Currently, when the high-speed maglev train stops, a contact collector rail (or a non-contact collector coil) is used to continuously supply power to the train, to facilitate power consumption of the system such as lighting and air-conditioning. In addition, the contact collector rail (or the non-contact collector coil) is further used to charge a power supply battery of the train, to facilitate power consumption of train re-levitation and operation. In China, online operation maglev rail transport lines are short and single, and the number of online operation trains is small. In addition, the high-speed maglev train adopts redundancy design of high reliability, so when the train fails, the train can runs to the contact collector rail (or the non-contact power supply coil) of a nearest parking station. Therefore, the high-speed maglev train on a short-distance running line has no technical problem of power supply when stopping due to fault in China.

In order to continue to supply power to the train when the train stops due to fault at any place on the long-distance running line, the collector rail (or the power supply coil) may be laid on the whole line, which greatly increase maglev rail cost, maintenance cost and power supply cost. In addition, since the train adopts redundancy design of high reliability, the probability of the train stopping due to fault is small, and laying the power supply rail (or the power supply coil) on the whole line results in a very low economic benefit. Therefore, it is required a special vehicle-mounted energy storage system to solve the technical problem of power supply for a high-speed maglev train when the train stopping due to fault in a long-distance running.

SUMMARY

In order to solve the above problem, a power supply battery and a power supply system for a high-speed maglev train are provided according to embodiments of the present disclosure.

In a first aspect, a power supply battery for a high-speed maglev train is provided according to an embodiment of the present disclosure. The power supply battery includes an electrolyte tank, multiple liquid flow pumps and multiple aluminum air battery reactors. The aluminum air battery reactors are connected in series.

The electrolyte tank includes multiple strip-shaped electrolyte grooves. One of the multiple liquid flow pumps corresponds to one of the multiple aluminum air battery reactors and corresponds to one of the multiple electrolyte grooves.

An inlet of the liquid flow pump is arranged in the electrolyte groove, and an outlet of the liquid flow pump is connected with a liquid inlet of the aluminum air battery reactor. The liquid flow pump is configured to pump an electrolyte in the electrolyte tank into the aluminum air battery reactor.

The aluminum air battery reactor includes multiple aluminum air single batteries connected in series. The aluminum air single battery is configured to react with the pumped electrolyte to generate electricity.

In an embodiment, the aluminum air battery reactor is arranged above the electrolyte groove corresponding to the aluminum air battery reactor. A liquid outlet of the aluminum air battery reactor is arranged on top of the aluminum air battery reactor.

In an embodiment, the number of the electrolyte tank is more than one, and the aluminum air battery reactor corresponding to any one of the electrolyte tanks and the aluminum air battery reactor corresponding to another electrolyte tank adjacent to the one electrolyte tank are connected in series.

In an embodiment, the power supply battery further includes a starting power supply, a battery management system and a cooling device.

The starting power supply is connected with the battery management system to supply power to the battery management system during startup.

The battery management system is connected with the liquid flow pump, to provide operating voltage for the liquid flow pump.

The aluminum air battery reactor is further configured to supply power to a vehicle-mounted power consumption load and the battery management system.

The cooling device is arranged on periphery of the aluminum air battery reactor to dissipate heat from the aluminum air battery reactor.

In an embodiment, the cooling device includes a cooling fan and a heat sink.

The heat sink is arranged on the periphery of the aluminum air battery reactor, and an air outlet of the cooling fan faces towards the heat sink.

An inlet of the heat sink is connected with the liquid outlet of the aluminum air battery reactor, and an outlet of the heat sink is connected with a liquid inlet of the electrolyte tank.

In an embodiment, an air inlet of the cooling fan is communicated with a cavity of the aluminum air battery reactor.

In an embodiment, the starting power supply is a vehicle-mounted secondary battery.

In an embodiment, the aluminum air battery reactor is further configured to charge the vehicle-mounted secondary battery.

In an embodiment, the power supply battery further includes a heating device.

The heating device is connected with the battery management system, and is provided with power by the battery management system to heat the electrolyte tank.

In an embodiment, the power supply battery further includes a single-phase diode.

The aluminum air battery reactor supplies power to another device by the single-phase diode.

In a second aspect, a power supply system for a high-speed maglev train is further provided according to an embodiment of the present disclosure. The power supply system includes a power supply battery pack, a voltage converter and a power supply grid. The power supply battery pack includes n power supply batteries described above that are connected in parallel.

An output end of the power supply battery pack is connected with the power supply grid through the voltage converter. The voltage converter is configured to convert an output voltage of the power supply battery pack into a vehicle-mounted power supply voltage.

In an embodiment, the power supply battery pack further includes n contactors. Each of the n contactors is connected in series with the corresponding power supply battery.

In an embodiment, the power supply system for a high-speed maglev train further includes a low-voltage converter, a low-voltage power grid and a vehicle-mounted control system.

An input end of the low-voltage converter is connected with the power supply grid, and an output end of the low-voltage converter is connected with the low-voltage power grid, to reduce the vehicle-mounted power supply voltage of the power supply grid.

The vehicle-mounted control system is connected with the low-voltage power grid and is provided with power by the low-voltage power grid. The vehicle-mounted control system is further connected with the battery management system of the power supply battery, to control operating states of the battery management system.

In the solutions according to the first aspect of the embodiment of the present disclosure, the aluminum air battery has the advantages of long-time storage without power loss, a high energy density, a high safety, rich resources, a low manufacture cost, cleanness, easy to be recycled and so on, and thus the aluminum air battery is used as the power supply battery for the vehicle-mounted energy storage system of the high-speed maglev train. In addition, the electrolyte tank is divided into multiple strip-shaped electrolyte grooves, and each of the multiple electrolyte grooves is provided with an aluminum air battery reactor and a liquid flow pump, so that a high voltage of the power supply battery can be ensured and the self-discharge can be reduced, which is conducive to high integration of the aluminum air battery, thereby reducing installation space, and achieving continuous operation to continuously provide energy to load of the maglev train.

To make the above objects, features and advantages of the present disclosure more apparent and easier to be understood, preferred embodiments are illustrated in detail in conjunction with the drawings hereinafter.

BRIEF DESCRIPTION OF THE DRAWINGS

In order to illustrate technical solution according to the embodiments of the disclosure or in the conventional technology more clearly, the drawings to be used in the description of the embodiments or the conventional technology are described briefly hereinafter. Apparently, the drawings described hereinafter are only some embodiments of the present disclosure, and other drawings may be obtained by those skilled in the art based on those drawings without creative effort.

REFERENCE NUMBERS IN THE FIGURES

| | |
|---|---|
| 10 electrolyte tank; | 20 liquid flow pump; |
| 30 aluminum air battery reactor; | 40 starting power supply; |
| 50 battery management system; | 60 cooling device; |
| 70 heating device; | 101 electrolyte groove; |
| 102 through-hole; | 301 aluminum air single battery; |
| 302 wire; | 601 cooling fan; |
| 602 heat sink; | 100 power supply battery pack; |
| 200 voltage converter; | 300 power supply grid; |
| 400 low-voltage converter; | 500 low-voltage power grid; |
| 600 vehicle-mounted control system. | |

DETAILED DESCRIPTION

In the description of the present disclosure, it should be understood that the orientation or positional relationships indicated by terms such as "center", "longitudinal", "lateral", "length", "width", "thickness", "up", "down", "front", "rear", "left", "right", "vertical", "horizontal", "top", "bottom", "inner", "outer", "clockwise", "anticlockwise" and the like are based on the orientation or positional relationships shown in the drawings, and are merely for the convenience of describing the present disclosure and the simplification of the description, and do not indicate or imply that the device or component referred must be in a particular orientation, or be constructed and operated in a particular orientation, and therefore should not be construed as a limitation to the scope of the present disclosure.

In addition, the terms "first" and "second" are only used for descriptive purposes, and cannot be understood as indicating or implying relative importance or implicitly indicating the number of indicated technical features. Therefore, the features defined by "first" and "second" may explicitly or implicitly include one or more of the features. In the description of the present disclosure, the meaning of "multiple/plurality of" is two or more, unless specifically defined otherwise.

In the description of the present disclosure, terms such as "install", "link", "connect" and "fix" should be understood broadly, unless otherwise specifically defined. For example, it may be fixedly connected, detachably connected or integrally connected; it may be mechanically connected or electrically connected; it may be directly connected or indirectly connected through intermediate media, or inner parts of two components are in communication with each other. For those skilled in the art, the specific meanings of the above terms in the present disclosure can be understood according to specific circumstances.

Figure 1:
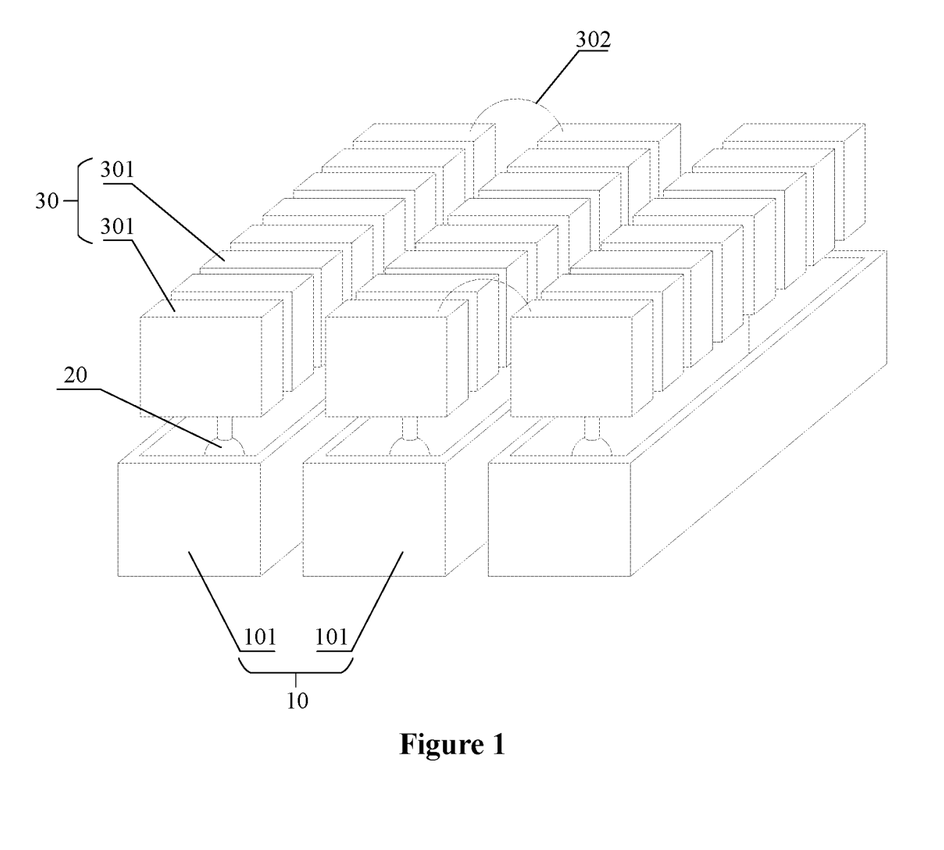
FIG. 1 is a schematic structural diagram of a power supply battery for a high-speed maglev train according to a first embodiment of the present disclosure.

A power supply battery for a high-speed maglev train is provided according to an embodiment of the present disclosure. As shown in FIG. 1, the power supply battery for a high-speed maglev train includes an electrolyte tank 10, multiple liquid flow pumps 20 and multiple aluminum air battery reactors 30. The multiple aluminum air battery reactors 30 are connected in series. As shown in FIG. 1, two aluminum air battery reactors 30 are connected in series with each other via a wire 302.

Figure 3:
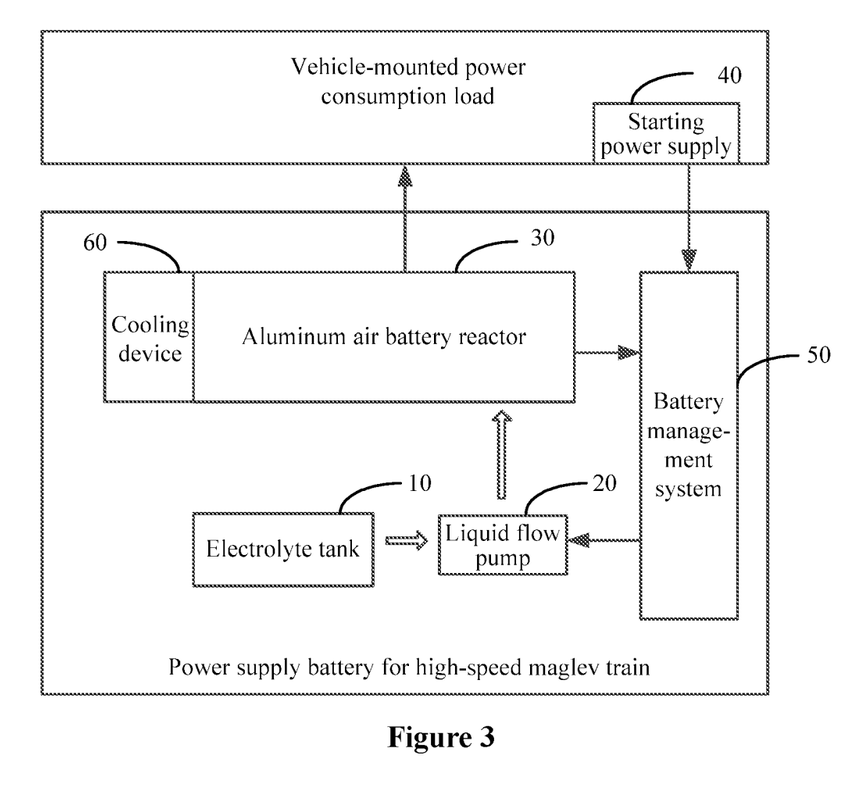
FIG. 3 is a schematic structural diagram of a power supply battery for a high-speed maglev train according to a second embodiment of the present disclosure.

The electrolyte tank 10 includes multiple strip-shaped electrolyte grooves 101. One liquid flow pump 20 corresponds to one aluminum air battery reactors 30, and corresponds to one electrolyte grooves 101. FIG. 3 is illustrated by taking three liquid flow pumps 20 and three aluminum air battery reactors 30, as an example. In addition, the aluminum air battery reactor includes multiple aluminum air single batteries connected in series. As shown in FIG. 3, each of the aluminum air battery reactors includes eight aluminum air single batteries 301.

An inlet of the liquid flow pump 20 is arranged in the electrolyte groove 101, and an outlet of the liquid flow pump 20 is connected with a liquid inlet of the aluminum air battery reactor 30. The liquid flow pump 20 is configured to pump an electrolyte in the electrolyte tank 10 into the aluminum air battery reactor 30. The aluminum air battery reactor 30 includes multiple aluminum air single batteries 301 connected in series. The aluminum air single battery 301 is configured to react with the pumped electrolyte to generate electricity.

In the embodiment of the present disclosure, an aluminum air fuel battery is used as the power supply battery for the high-speed maglev train. As a power supply battery of the vehicle-mounted energy storage system of the high-speed maglev train, the aluminum air battery has the advantages of long-time storage without power loss, a high energy density, a high safety, rich resources, a low manufacture cost, cleanness, easy to be recycled and so on.

In addition, in order to solve the technical problem of power supply for a high-speed maglev train when stopping due to fault in a long-distance running, it is required that the power supply battery has high capacity, and thus more aluminum air single batteries need to be connected in series. If the number of the aluminum air single batteries connected in series in the aluminum air battery reactor is excessive, the electrolyte in the aluminum air battery reactor equivalent to a load, and the electrolyte and the aluminum air single batteries connected in series form a self-discharge circuit, resulting in self-discharge phenomenon. The number of the aluminum air single batteries connected in series is more, the self-discharge is more serious, resulting in electrolyte heating and affecting heat dissipation effect of the power supply battery.

In the embodiment, in order to reduce the self-discharge effect, the electrolyte tank 10 is divided into multiple strip-shaped electrolyte grooves 101. Each of the multiple electrolyte grooves 101 is provided with an aluminum air battery reactor 30 and a liquid flow pump 20, that is, electrolyte circuits in different aluminum air battery reactors 30 are independent of each other, so as to avoid the problem of the excessive number of the aluminum air single batteries connected in series. In addition, the aluminum air battery reactors 30 are connected in series with each other sequentially, so that a high voltage of the whole power supply battery can be ensured and the self-discharge effect can be reduced, which is conducive to high integration of the aluminum air battery, thereby reducing installation space.

Figure 2:
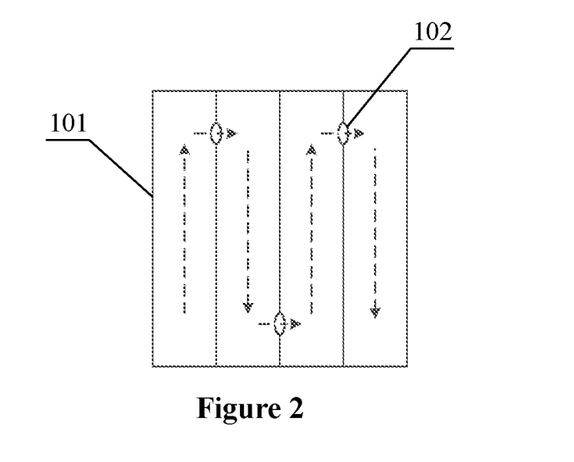
FIG. 2 is a schematic top view of an electrolyte tank in a power supply battery for a high-speed maglev train according to an embodiment of the present disclosure.

In an embodiment, reference is made to FIG. 2, which shows a schematic top view of the electrolyte tank 10. A through-hole 102 may be arranged between adjacent electrolyte grooves 101, so that electrolytes in the electrolyte grooves 101 can communicate with each other. In addition, all the through-holes 102 are arranged on different sides of the electrolyte groove 101 in sequence, so that an S-shaped electrolyte circuit is formed in the electrolyte tank 10, that is, a dotted line as shown in FIG. 2. All the electrolyte grooves 101 form an entire circuit, which may be connected with a cooling device, therefor simplifying the overall structure.

In an embodiment, the number of the electrolyte tank 10 may also be more than one. The aluminum air battery reactor 30 corresponding to any one of electrolyte tanks 10 and the aluminum air battery reactor 30 corresponding to another electrolyte tank 10 adjacent to the one electrolyte tank 10 are connected in series with each other sequentially.

In the power supply battery for a high-speed maglev train according to the embodiment of the present disclosure, the aluminum air battery has the advantages of long-time storage without power loss, a high energy density, a high safety, rich resources, a low manufacture cost, cleanness, easy to be recycled and so on, and thus the aluminum air battery is used as the power supply battery for the vehicle-mounted energy storage system of the high-speed maglev train. In addition, the electrolyte tank is divided into multiple strip-shaped electrolyte grooves, and each of the multiple electrolyte grooves is provided with an aluminum air battery reactor and a liquid flow pump, so that a high voltage of the whole power supply battery can be ensured and the self-discharge effect can be reduced, which is conducive to high integration of the aluminum air battery, thereby reducing installation space.

Based on the above embodiment, the aluminum air battery reactor 30 is arranged above the corresponding electrolyte groove 101. A liquid outlet of the aluminum air battery reactor 30 is arranged on top of the aluminum air battery reactor 30.

In the embodiment of the present disclosure, the aluminum air battery reactor 30 is arranged above the corresponding electrolyte groove 101. The liquid outlet of the aluminum air battery reactor 30 is arranged on top of the aluminum air battery reactor 30. When the electrolyte needs to be pumped into the aluminum air battery reactor 30, the electrolyte is pumped in from bottom of the aluminum air battery reactor 30 and flows out from top of the aluminum air battery reactor 30. If the liquid flow pump 20 stops operating, no electrolyte enter the aluminum air battery reactor 30 by mistake, so that if the aluminum air battery reactor 30 is not used for power generation, no electrolyte will enter the aluminum air battery reactor 30 by mistake, even if the electrolyte shakes in the electrolyte tank 10 because of the maglev train operating.

It should be noted that in order to facilitate display of a structure of the power supply battery, gaps are arranged between any adjacent components shown in FIG. 1. Those skilled in the art should understand that all components may be arranged closely to improve space utilization rate. For example, adjacent electrolyte grooves 101 are close to each other, and adjacent aluminum air batteries 301 are also close to each other, so as to save space.

Based on the above embodiment, as shown in FIG. 3, the power supply battery further includes a starting power supply 40, a battery management system 50 and a cooling device 60.

Specifically, as shown in FIG. 3, the starting power supply 40 is connected with the battery management system 50 to supply power to the battery management system 50 during startup. The battery management system 50 is connected with the liquid flow pump 20, to provide operating voltage for the liquid flow pump 20.

The aluminum air battery reactor is further configured to react with the pumped electrolyte to generate electricity, and supply power to a vehicle-mounted power consumption load and the battery management system 50. The cooling device 60 is arranged on periphery of the aluminum air battery reactor 30 to dissipate heat from the aluminum air battery reactor 30.

The operating process of the power supply battery of a high-speed maglev train according to the embodiment of the present disclosure is as follows.

In a case that the power supply battery is to be used for power supply, the liquid flow pump 20 is started, that is, the liquid flow pump is powered by the starting power supply 40. Specifically, the battery management system 50 is provided with a wire directly connecting the starting power supply 40 and the liquid flow pump 20 electrically, so that the starting power supply 40 can supply power to the liquid flow pump 20. Alternatively, the battery management system 50 is provided with a power supply processing circuit to process electric energy of the starting power supply 40, and then transmit the processed electric energy to the liquid flow pump 20, so that the liquid flow pump 20 starts to operate. The battery management system 50 is specifically configured to control operating states of the aluminum air battery and the liquid flow pump 20, such as control start and stop, and control rotate speed. The power supply processing circuit may be a voltage conversion circuit, a switch control circuit and so on, which is not limited in this embodiment.

After the liquid flow pump 20 starts to operate, the electrolyte in the electrolyte tank 10 is pumped into the aluminum air battery reactor 30, so that the electrolyte can react with the battery reactor to generate electricity. The electrolyte may be aqueous solution of potassium hydroxide (KOH) or aqueous solution of sodium hydroxide (NaOH). In addition, when the electrolyte reacts with the battery reactor 50, chemical energy is converted into electric energy, and also into heat energy, that is, the reaction process generates heat, resulting in temperature increase of the aluminum air battery reactor 30. In the embodiment of the present disclosure, the cooling device 60 is configured to dissipate heat from the aluminum air battery reactor 30, so as to avoid high temperature of the aluminum air battery reactor.

Currently, a secondary battery (such as an alkaline battery and a lithium battery) is mainly used as the power supply of the vehicle-mounted energy storage system of the high-speed maglev train. The secondary battery is capable of charging and discharging, and has an advantage of being used repeatedly. However, a long-term storage of the secondary battery leads to reduction of the battery discharge, and the secondary battery further has technical problems such as a heavy weight and additional requirement of a battery charging control logic circuit design. High-purity aluminum (99.99%) is uses as a negative electrode of the aluminum air battery, oxygen as a positive electrode of the aluminum air battery, and the aqueous solution of potassium hydroxide (KOH) or the aqueous solution of sodium hydroxide (NaOH) is uses as the electrolyte. Aluminum reacts with oxygen in the air when the battery discharges, to convert chemical energy into electrical energy. Taking the sodium hydroxide electrolyte as an example, the specific reaction process is described by the following chemical equation:

$$Al+O_2+NaOH \rightarrow NaAlO_2+H_2O.$$

In the embodiment of the present disclosure, the aluminum air battery has the advantages of long-time storage without power loss, a high energy density, a high safety, rich resources, a low manufacture cost, cleanness, easy to be recycled and so on, and thus the aluminum air battery is used as the power supply of the vehicle-mounted energy storage system of the high-speed maglev train. In addition, as a backup power supply energy storage system of the high-speed maglev train when the train stops due to fault, the aluminum air fuel battery is mainly used to supply power to a required load of the train and a vehicle-mounted power battery, and thus the required power density is relatively low. In addition, the train adopts redundancy design of high reliability, so that failure probability that the train stops at a non-stop station is low. Therefore, the aluminum air battery is an ideal choice as a backup energy storage system of the high-speed maglev train.

Moreover, during the aluminum air battery discharging, the liquid flow pump 20 is required to pump the electrolyte in the electrolyte tank 10 into the aluminum air battery reactor 50 for a short time period. After the aluminum air battery reactor 50 reacts with the pumped electrolyte, the power is provided for the liquid flow pump 20. Therefore, in the embodiment of the present disclosure, an additional starting power supply 40 is arranged to start the aluminum air battery. Capacity of the starting power supply 40 is not required to be large, so there is a low requirement on the capacity of the starting power supply 40. Specifically, the vehicle-mounted secondary battery of the high-speed maglev train may be used as the starting power supply of the aluminum air battery. When the aluminum air battery reactor generates electricity, the aluminum air battery reactor can supply power to the battery management system 50, the liquid flow pump 30, the train load and other devices, so that power generation process of the aluminum air fuel battery is achieved.

In the power supply battery for a high-speed maglev train according to the embodiment of the present disclosure, the aluminum air battery has the advantages of long-time storage without power loss, a high energy density, a high safety, rich resources, a low manufacture cost, cleanness, easy to be recycled and so on, and thus the aluminum air battery is used as the power supply for the vehicle-mounted energy storage system of the high-speed maglev train. The starting power supply is used to start the aluminum air battery to generate electricity, and then the aluminum air battery is used to supply power to the battery management system, the liquid flow pump and so on, so as to achieve continuous operation to continuously provide energy to load of the maglev train.

Figure 4:
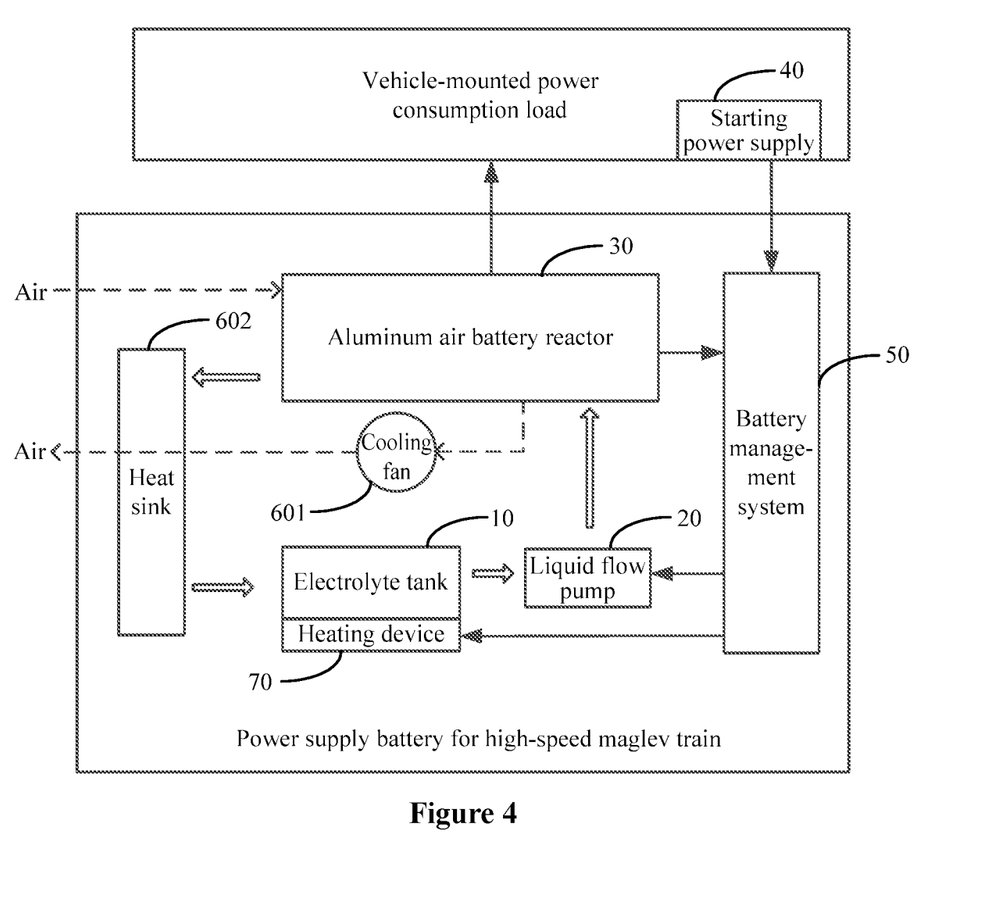
FIG. 4 is a schematic structural diagram of a power supply battery for a high-speed maglev train according to a third embodiment of the present disclosure.

Based on the above embodiment, as shown in FIG. 4, the cooling device 60 includes a cooling fan 601 and a heat sink 602.

The heat sink 602 is arranged on the periphery of the aluminum air battery reactor 30, and an air outlet of the cooling fan 601 faces towards the heat sink 602. An inlet of the heat sink 602 is connected with the liquid outlet of the aluminum air battery reactor 30, and an outlet of the heat sink 602 is connected with a liquid inlet of the electrolyte tank 10.

Currently, load characteristic of the aluminum air fuel battery during discharging is relatively soft, and an occupying space is relatively large. The rail transit industry has a strict requirement on the size of device space, and the space for installation of the power supply battery on the maglev train is small. Therefore, the conventional aluminum air battery cannot be directly applied to the maglev train. In the embodiment of the present disclosure, the electrolyte that reacts with the battery reactor is used as a coolant of the heat sink 602 without an additional water-cooling system, which can reduce the space of the power supply battery, and efficiently dissipate heat by the electrolyte flowing out of the aluminum air battery reactor 50, thereby improving the heat dissipation efficiency.

The operating process of the cooling device 60 in the embodiment of the present disclosure is as follows. When the aluminum air battery is required to generate power, the liquid flow pump 20 pumps the electrolyte in the electrolyte tank 10 into the aluminum air battery reactor 30, so that the battery reactor reacts with the electrolyte and provides electric energy. In addition, the electrolyte (including the solution after reaction) in the aluminum air battery reactor is heated due to the chemical reaction. The heated electrolyte flows into the heat sink 602. The electrolyte in the heat sink 602 is cooled by the heat sink 602 and the cooling fan 601. The electrolyte flows through the heat sink 602 into the electrolyte tank 10, so that the liquid flow pump 20 pumps the electrolyte in the electrolyte tank 10 into the aluminum air battery reactor 30 again for power generation, and repeat in this way. The cooling device directly uses the electrolyte in the battery reactor as the coolant, which is equivalent to directly dissipate the heat from the electrolyte in the battery reactor, so that the heat dissipation efficiency is high. Moreover, it is not required an additional water-cooling system, which can reduce the volume of the battery and is more suitable for the maglev train.

Based on the above embodiment, as shown in FIG. 4, a thin line arrow represents a circuit, a thick line arrow represents a water path of the electrolyte, and a dotted line represents an air path. Specifically, the air inlet of the cooling fan 601 is communicated with a cavity of the aluminum air battery reactor 30. In an operating process of the cooling fan 601, the cooling fan 601 sucks out the air from the cavity of the aluminum air battery reactor 30. In addition, due to pressure reduction in the cavity of the aluminum air battery reactor 30, external air is guided into the aluminum air battery reactor 30, so as to ensure oxygen content of the aluminum air battery reactor 30, and ensure that the aluminum air battery can efficiently perform chemical reaction. In addition, when the aluminum air battery performs chemical reaction, the air in the cavity of the aluminum air battery reactor 30 is hot air, and the hot air is sucked out by the cooling fan 601, which is conducive to further heat dissipation.

Based on the above embodiment, the aluminum air battery reactor 30 may further charge the vehicle-mounted secondary battery when generating electricity, that is, charge the starting power supply 40, so that the starting power supply 40 has sufficient power to start the power supply battery.

Based on the above embodiment, as shown in FIG. 4, the power supply battery further includes a heating device 70. The heating device 70 is connected with the battery management system 50, and is provided with power by the battery management system 50 to heat the electrolyte tank 10.

In the embodiment of the present disclosure, the electrolyte tank 10 is configured to store the electrolyte. The electrolyte may be frozen in cold weather. The heating device 70 is arranged on bottom of the electrolyte tank 10. In a case that the electrolyte is frozen, the heating device 70 heats and thaws the electrolyte, so that the liquid flow pump 20 can pump out the electrolyte. After the aluminum air battery operates normally, the heating device 70 can be turned off.

Based on the above embodiment, the power supply battery further includes a single-phase diode. The aluminum air battery reactor 30 supplies power to another device through the single-phase diode. In the embodiment of the present disclosure, the single-phase diode is arranged at an output end of the aluminum air battery reactor 30 to avoid current backflow.

In the power supply battery for a high-speed maglev train according to the embodiment of the present disclosure, the aluminum air battery has the advantages of long-time storage without power loss, a high energy density, a high safety, rich resources, a low manufacture cost, cleanness, easy to be recycled and so on, and thus the aluminum air battery is used as the power supply for the high-speed maglev train. The starting power supply is used to start the aluminum air battery to generate electricity, and then the aluminum air battery is used to supply power to the battery management system, the liquid flow pump and so on, so as to achieve continuous operation to continuously supply energy to load of the maglev train. The cooling device directly uses the electrolyte in the battery reactor as the coolant, which is equivalent to directly dissipate the heat from the electrolyte in the battery reactor, so that the heat dissipation efficiency is high. Moreover, it is required no additional water-cooling system, which can reduce the volume of the battery and is more suitable for the maglev train. The air inlet of the cooling fan is communicated with the cavity of the aluminum air battery reactor, which can further improve the heat dissipation efficiency while ensuring sufficient oxygen in the aluminum air battery reactor.

Figure 5:
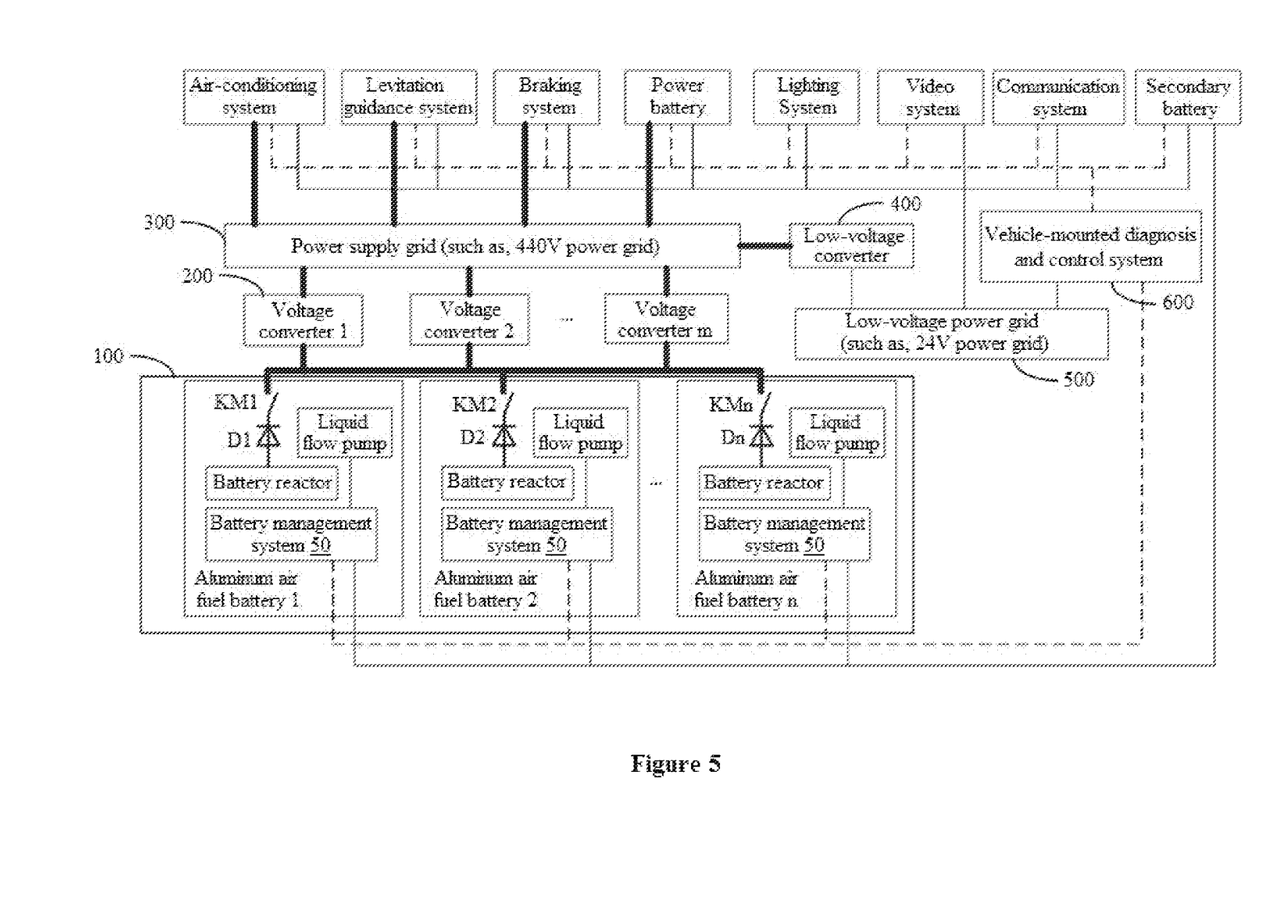
FIG. 5 is a schematic structural diagram of a power supply system for a high-speed maglev train according to an embodiment of the present disclosure.

Based on the same inventive concept, a power supply system for a high-speed maglev train is further provided according to an embodiment of the present disclosure. As shown in FIG. 5, the power supply system includes a power supply battery pack 100, a voltage converter 200 and a power supply grid 300. The power supply battery pack 100 includes n power supply batteries connected in parallel. An output end of the power supply battery pack 100 is connected with the power supply grid 300 through the voltage converter 200. The voltage converter 200 is configured to convert an output voltage of the power supply battery pack 100 into a vehicle-mounted power supply voltage.

In the embodiment of the present disclosure, the power supply battery is the aluminum air fuel battery described in the above embodiment, n aluminum air fuel batteries are connected in parallel for power supply. The voltage converter 200 is configured to stabilize an output voltage of the aluminum air fuel battery and convert the output voltage into the vehicle-mounted power supply voltage required by the maglev train, such as 440V, and then the power supply grid 300 supplies power to a vehicle-mounted power consumption device, such as an air-conditioning system and a maglev guidance system in FIG. 5.

In the power supply system for a high-speed maglev train according to the embodiment of the present disclosure, the aluminum air battery has the advantages of long-time storage without power loss, a high energy density, a high safety, rich resources, a low manufacture cost, cleanness, easy to be recycled and so on, and thus the aluminum air battery is used as the power supply for the high-speed maglev train. The redundant design of multiple power supply batteries and multiple voltage converters can realize redundant power supply for the train. In a case that one aluminum air fuel battery fails, other aluminum air fuel batteries continue to supply power for the train. In this way, seamless switching of power supply connection of the aluminum air fuel battery can be achieved, thereby increasing the reliability of the power supply system.

Based on the above embodiment, as shown in FIG. 5, the power supply battery pack further includes n contactors KM. Each of the n contactors KM is connected in series with the corresponding power supply battery. As shown in FIG. 5, n contactors (including KM1 to KIVIn) correspond to n power supply batteries (including aluminum air fuel cells 1 to aluminum air fuel cells n), and the contactor KM is arranged at the output end of the power supply battery, so as to achieve the parallel connection and removal of the multiple aluminum air batteries. In addition, a diode D in FIG. 5 is an unidirectional diode of the power supply battery to avoid current backflow.

Based on the above embodiment, as shown in FIG. 5, the power supply system further includes a low-voltage converter 400, a low-voltage power grid 500 and a vehicle-mounted control system 600.

An input end of the low-voltage converter 400 is connected with the power supply grid 300, and an output end of the low-voltage converter 400 is connected with the low-voltage power grid 500, to reduce the vehicle-mounted power supply voltage of the power supply grid 300. The vehicle-mounted control system 600 is connected with the low-voltage power grid 500 and is provided with power by the low-voltage power grid 500. In addition, the vehicle-mounted control system 600 is further connected with the battery management system 50 of the power supply battery, to control operating states of the battery management system 50.

In the embodiment of the present disclosure, the power supply system converts a high voltage to a low voltage by the low-voltage converter 400, so as to provide a low voltage for the vehicle-mounted power consumption device. Moreover, the vehicle-mounted power consumption device and the power supply battery pack 100 can be controlled by the vehicle-mounted control system 600. Specifically, as shown in FIG. 5, a thick line represents a power supply line, a thin line represents a low-voltage line and the dotted line represents a signal line. The fault removal of the aluminum air battery in the power supply battery pack 100 and the removal of unnecessary loads of the train may be controlled by the vehicle-mounted control system 600, so that an interface relationship between the aluminum air fuel battery and a train power supply network can be achieved, thereby achieving the power supply for the whole maglev train.

The above are only specific embodiments of the present disclosure, but the scope of protection of the present disclosure is not limited thereto. Changes and substitutions which may be easily thought by those skilled in the art within the technical scope disclosed in the present disclosure should fall within the protection scope of the present disclosure. Therefore, the protection scope of the present disclosure is defined by the claims.

The invention claimed is:

1. A power supply battery in a high-speed maglev train, comprising an electrolyte tank, a plurality of liquid flow pumps and a plurality of aluminum air battery reactors, the plurality of aluminum air battery reactors being connected in series, wherein the electrolyte tank comprises a plurality of strip-shaped electrolyte grooves, one of the plurality of liquid flow pumps corresponds to one of the plurality of aluminum air battery reactors and corresponds to one of the plurality of strip-shaped electrolyte grooves;

an inlet of each of the plurality of liquid flow pumps is arranged in a corresponding electrolyte groove of the plurality of strip-shaped electrolyte grooves, and an outlet of each of the plurality of liquid flow pumps is connected with a liquid inlet of a corresponding aluminum air battery reactor of the plurality of aluminum air battery reactors, and each of the plurality of liquid flow pumps is configured to pump an electrolyte in the electrolyte tank into the corresponding aluminum air battery reactor of the plurality of aluminum air battery reactors;

each of the plurality of aluminum air battery reactors comprises a plurality of aluminum air single batteries connected in series, and each of the plurality of aluminum air single batteries is configured to react with the pumped electrolyte to generate electricity; and a through-hole is arranged between every two adjacent electrolyte grooves of the plurality of strip-shaped electrolyte grooves, and all through-holes are arranged on a first end or a second end of adjacent edges of the plurality of strip-shaped electrolyte grooves in an alternative way.

2. The power supply battery in a high-speed maglev train according to claim 1, wherein each of the plurality of aluminum air battery reactors is arranged above a corresponding electrolyte groove of the plurality of strip-shaped electrolyte grooves; and a liquid outlet of each of the plurality of aluminum air battery reactors is arranged on top of a corresponding aluminum air battery reactor of the plurality of aluminum air battery reactors.

3. The power supply battery in a high-speed maglev train according to claim 1, wherein a quantity of the electrolyte tanks is more than one, and an aluminum air battery reactor of the plurality of aluminum air battery reactors corresponding to one electrolyte tank and an aluminum air battery reactor of the plurality of aluminum air battery reactors corresponding to another electrolyte tank adjacent to the one electrolyte tank are connected in series.

4. The power supply battery in a high-speed maglev train according to claim 1, further comprising a starting power supply, a battery management system and a cooling device, wherein, the starting power supply is connected with the battery management system, to supply power to the battery management system during startup;

the battery management system is connected with the plurality of liquid flow pumps, to provide operating voltage for the plurality of liquid flow pumps;

each of the plurality of aluminum air battery reactors is further configured to supply power to a vehicle-mounted power consumption load and the battery management system; and the cooling device is configured to dissipate heat from the plurality of aluminum air battery reactors.

5. The power supply battery in a high-speed maglev train according to claim 4, wherein the cooling device comprises a cooling fan and a heat sink, wherein an air outlet of the cooling fan faces towards the heat sink; and an inlet of the heat sink is connected with liquid outlets of the plurality of aluminum air battery reactors, and an outlet of the heat sink is connected with a liquid inlet of the electrolyte tank.

6. The power supply battery in a high-speed maglev train according to claim 5, wherein an air inlet of the cooling fan is communicated with cavities of the plurality of aluminum air battery reactors.

7. The power supply battery in a high-speed maglev train according to claim 4, wherein the starting power supply is a vehicle-mounted secondary battery.

8. The power supply battery in a high-speed maglev train according to claim 7, wherein each of the plurality of aluminum air battery reactors is further configured to charge the vehicle-mounted secondary battery.

9. The power supply battery in a high-speed maglev train according to claim 4, further comprising a heating device, wherein the heating device is connected with the battery management system, and is provided with power by the battery management system to heat the electrolyte tank.

10. The power supply battery in a high-speed maglev train according to claim 1, further comprising a single-phase diode, wherein the plurality of aluminum air battery reactors supply power to another device by the single-phase diode.

11. A power supply system in a high-speed maglev train, comprising a power supply battery pack, a first voltage converter and a first power supply grid, wherein the power supply battery pack comprises n power supply batteries according to claim 1 that are connected in parallel;

an output end of the power supply battery pack is connected with the first power supply grid through the first voltage converter; and the first voltage converter is configured to convert an output voltage of the power supply battery pack into a vehicle-mounted power supply voltage.

12. The power supply system in a high-speed maglev train according to claim 11, wherein the power supply battery pack further comprises n contactors; and each of the n contactors is connected in series with the corresponding power supply battery.

13. The power supply system in a high-speed maglev train according to claim 11, further comprising a second voltage converter which outputs a voltage lower than a voltage of the first voltage converter, a second voltage power grid which has a voltage lower than a voltage of the first power supply grid, and a vehicle-mounted control system; wherein an input end of the second voltage converter is connected with the power supply grid, and an output end of the second voltage converter is connected with the second voltage power supply grid, to reduce the vehicle-mounted power supply voltage of the first power supply grid to the voltage of the second power supply grid;

the vehicle-mounted control system is connected with the second voltage power supply grid and is provided with power by the second voltage power supply grid; and the vehicle-mounted control system is further connected with the battery management system of the power supply battery, to control operating states of the battery management system.

* * * * *